(12) United States Patent
Yoon et al.

(10) Patent No.: US 7,813,428 B2
(45) Date of Patent: Oct. 12, 2010

(54) METHOD OF ENCODING AND DECODING VIDEO SIGNALS

(75) Inventors: Doe Hyun Yoon, Seoul (KR); Ji Ho Park, Seoul (KR); Seung Wook Park, Seoul (KR); Byeong Moon Jeon, Seoul (KR); Dong Seok Kim, Seoul (KR); Soung Hyun Um, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 11/996,183

(22) PCT Filed: Jul. 21, 2006

(86) PCT No.: PCT/KR2006/002882

§ 371 (c)(1),
(2), (4) Date: Jun. 4, 2008

(87) PCT Pub. No.: WO2007/011189

PCT Pub. Date: Jan. 25, 2007

(65) Prior Publication Data

US 2008/0291997 A1    Nov. 27, 2008

Related U.S. Application Data

(60) Provisional application No. 60/701,043, filed on Jul. 21, 2005.

(30) Foreign Application Priority Data

Jun. 27, 2006   (KR) .................. 10-2006-0057857

(51) Int. Cl.
*H04B 1/66*    (2006.01)

(52) U.S. Cl. ..................... 375/240.12; 375/240.25; 375/240.29; 375/240.26; 375/240.2; 382/233; 382/235; 382/260; 382/238

(58) Field of Classification Search ............ 375/240.12, 375/240.25, 240.29, 240.26, 240.2; 382/233, 382/235, 260, 238
See application file for complete search history.

(56) References Cited

U.S. PATENT DOCUMENTS 7,627,034 B2 *  12/2009  Park et al. .............. 375/240.08
2002/0154697 A1  10/2002  Jeon

FOREIGN PATENT DOCUMENTS

KR   1999-008784   2/1999

(Continued)

OTHER PUBLICATIONS

Korean Notice of Allowance in Application No. 2008-7003974, dated May 21, 2009, 4 pages.

(Continued)

*Primary Examiner*—Shawn An
(74) *Attorney, Agent, or Firm*—Fish & Richardson P.C.

(57) ABSTRACT

Disclosed herein is a method of encoding video signals. The method includes creating a bit stream of a first layer by encoding the video signals, and creating a bit stream of a second layer by encoding the video signals based on the first layer. When residual data, corresponding to an image difference, within the first layer, is up-sampled and used for the encoding of the second layer, the residual data is up-sampled for each block that is predicted based on motion compensation.

4 Claims, 5 Drawing Sheets

FOREIGN PATENT DOCUMENTS

| KR | 10-2004-0046890 | 6/2004 |
| KR | 10-2006-0063433 | 6/2006 |
| KR | 10-2006-0063533 | 6/2006 |
| WO | WO 03/036983 | 5/2003 |
| WO | WO 03/036983 A2 * | 5/2003 |

OTHER PUBLICATIONS

International Search Report (International Application No. PCT/KR2006/002882), dated Oct. 31, 2006 (3 total pages).

European Search Report (Application No./Patent No. 06769295.4-1247 / 1920606 PCT/KR2006002882), dated Mar. 5, 2009 (8 total pages).

JVT: "Joint Scalable Video Model JSVM-2, Annex" Video Standards and Drafts, No. JVT-O202, Apr. 22, 2005, XP030006027, pp. 1-31.

Ying C. et al.: "New downsampling and upsampling processes for chroma in SVC spatial scalability" Video Standards and Drafts, No. JVT-O077r2, May 29, 2005, XP030006020, pp. 1-7.

* cited by examiner base_layer_resolution != enhanced_layer_resolution

— — —  Macroblock boundary
- - - -   MC prediction partition boundary
·········  Transform block boundary

METHOD OF ENCODING AND DECODING VIDEO SIGNALS

1. TECHNICAL FIELD

The present invention relates to a method of encoding and decoding video signals.

2. BACKGROUND ART

A Scalable Video Codec (SVC) scheme is a video signal encoding scheme that encodes video signals at the highest image quality and can represent images at some level of image quality even though only part of a picture sequence (a sequence of frames that are intermittently selected from among the entire picture sequence) that is produced by the encoding is decoded and used.

A picture sequence encoded using the scalable method allows images to be represented at some level of image quality even if only a partial sequence thereof is received and processed. In the case where the bit rate is low, image quality is significantly degraded. In order to overcome this problem, a separate auxiliary picture sequence for the low bit rate, for example, small screens and/or a picture sequence having a low frame rate, may be provided.

An auxiliary picture sequence is referred to as a base layer, and a main picture sequence is referred to as an enhanced layer or enhancement layer. A base layer and its enhanced layer result from the encoding of the same source video signals. In the video signals of the two layers, redundancy exists. Accordingly, in the case where a base layer is provided, an interlayer prediction method of predicting the video signals of an enhanced layer using the motion information and/or texture information, corresponding to image data, of the base layer, and performing encoding based on the prediction may be employed so as to increase coding efficiency.

Prediction methods using the texture information of a base layer include an intra base prediction mode and a residual prediction mode.

An intra base prediction mode (simply referred to as an intra base mode) is a method of predicting and encoding a macro block of an enhanced layer based on a block of a base layer that corresponds to the macro block of the enhanced layer (a block that is located in the frame of the base layer temporally coincident with a frame including the macro block and has a region covering the macro block when enlarged at the ratio of the screen sizes of the enhanced layer and base layer) and has been encoded in an intra mode. In this case, the corresponding block of the base layer is decoded to have image data, and is then enlarged and used at the ratio of the screen sizes of the enhanced layer and base layer through up-sampling.

A residual prediction mode is similar to the intra base mode except that the residual prediction mode uses a corresponding block of a base layer having residual data, corresponding to an image difference value, not a corresponding block of a base layer encoded to have image data. Based on a corresponding block of a base layer that has been encoded in an inter mode and has residual data, predicted data is created for a macro block of an enhanced layer that has been encoded in an inter mode and has residual data. At this time, the corresponding block of the base layer having residual data is enlarged and used through up-sampling, as in the intra base mode.

FIG. 1 illustrates an embodiment in which an image block of an enhanced layer that has been encoded in an inter mode and has residual data is decoded using the residual data of a base layer.

A residual prediction flag indicating that an image block of an enhanced layer has been encoded in a residual prediction mode is set to '1', and corresponding residual data of the base layer is added to the residual data of the enhanced layer.

In the case where the spatial resolutions of the base layer and enhanced layer do not coincide with each other, the residual data of the base layer is up-sampled first. The up-sampling for the residual data (hereinafter simply referred to as residual up-sampling) is carried out in the following way, unlike up-sampling in an intra base mode, in which up-sampling is carried out after decoding into image data.

1. In the case where the resolution of an enhanced layer is two times the resolution of the base layer (in a dyadic case), bi-linear interpolation is employed.

2. In a non-dyadic case, a 6 tap interpolation filter is used.

3. Up-sampling is carried out using only pixels within the same transform block. Up-sampling filtering beyond the boundary of the transform block is not allowed.

FIG. 2 illustrates an example of the up-sampling of a 4×4 residual block in a dyadic case.

Simple bi-linear interpolation is used for residual up-sampling, but bi-linear interpolation is not applied to the boundary of a transform block so as to avoid the use of pixels within another transform block. Accordingly, as illustrated in FIG. 2, only the pixels of a corresponding block are used for the up-sampling of pixels existing at the boundary of a transform block. Furthermore, different operations are performed on pixels at the boundary of a transform block depending on the locations of pixels relative to the boundary.

Since a transform operation can be carried out for different block sizes, the boundary of a transform block must be determined in consideration of the size of the transform block of a base layer (for example, 4×4, 8×8, or . . . ).

Up-sampling processes are basically the same except that a 6 tap interpolation filter is used even in the case where the ratio of the resolutions of the base layer and enhanced layer is not dyadic. Pixels within another transform block are not used for residual up-sampling.

Furthermore, the same up-sampling is applied to the signals of luminance and chrominance components.

FIG. 3 illustrates an embodiment in which an image block of an enhanced layer encoded in an intra base mode is decoded using the decoded image data of a base layer.

In up-sampling in the intra base mode, the boundary of a transform block is not taken into consideration, and a 6 tap interpolation filter is applied to both luminance and chrominance signals.

3. DISCLOSURE OF INVENTION

Accordingly, the present invention has been made keeping in mind the above problems occurring in the prior art, and an object of the present invention is to provide a method of simply and efficiently up-sampling a base layer in interlayer prediction.

In order to accomplish the above object, the present invention provides a method of encoding video signals, including creating a bit stream of a first layer by encoding the video signals; and creating a bit stream of a second layer by encoding the video signals based on the first layer; wherein, when residual data, corresponding to an image difference, within the first layer, is up-sampled and used for the encoding of the second layer, the residual data is up-sampled on the basis of a block that is predicted according to motion compensation.

Additionally, the present invention provides a method of decoding an encoded video bit stream, including decoding a bit stream of a first layer; and decoding a bit stream of a second layer based on the first layer; wherein, when residual data, corresponding to an image difference, within the first layer, is up-sampled and used for the decoding of the second layer, the residual data is up-sampled on the basis of a block that is predicted according to motion compensation.

In an embodiment, when the ratio of resolutions of the first and second layers is two, the residual data is up-sampled using a bi-linear interpolation filter. In contrast, when the ratio of resolutions of the first and second layers is not two, the residual data is up-sampled using a 6 tap interpolation filter.

Additionally, the present invention provides a method of encoding video signals, including creating a bit stream of a first layer by encoding the video signals; and creating a bit stream of a second layer by encoding the video signals based on the first layer; wherein, when the first layer is up-sampled and used for the encoding of the second layer, different up-sampling methods are respectively applied to luminance data and chrominance data.

Additionally, the present invention provides a method of decoding an encoded video bit stream, including decoding a bit stream of a first layer; and decoding a bit stream of a second layer based on the first layer; wherein, when the first layer is up-sampled and used for the decoding of the second layer, different up-sampling methods are respectively applied to luminance data and chrominance data.

In an embodiment, the luminance data is up-sampled using a 6 tap interpolation filter, while the chrominance data is up-sampled using a bi-linear interpolation filter. In this case, weights may be applied to the up-sampling of the chrominance data, the weights being determined based on relative locations and/or phase shifts between chrominance data samples of the first and second layers.

In an embodiment, when residual data, corresponding to an image difference, within the first layer, is up-sampled by two corresponding to the ratio of resolutions of the first and second layers, samples to be inserted between four particular chrominance data samples are calculated using an identical equation. In this case, each of the samples to be inserted may be calculated as the average value of two corresponding pixels that belong to the four samples and are located in a diagonal direction.

4. BRIEF DESCRIPTION OF DRAWINGS

The above and other objects, features and advantages of the present invention will be more clearly understood from the following detailed description taken in conjunction with the accompanying drawings, in which.

Figure 6:
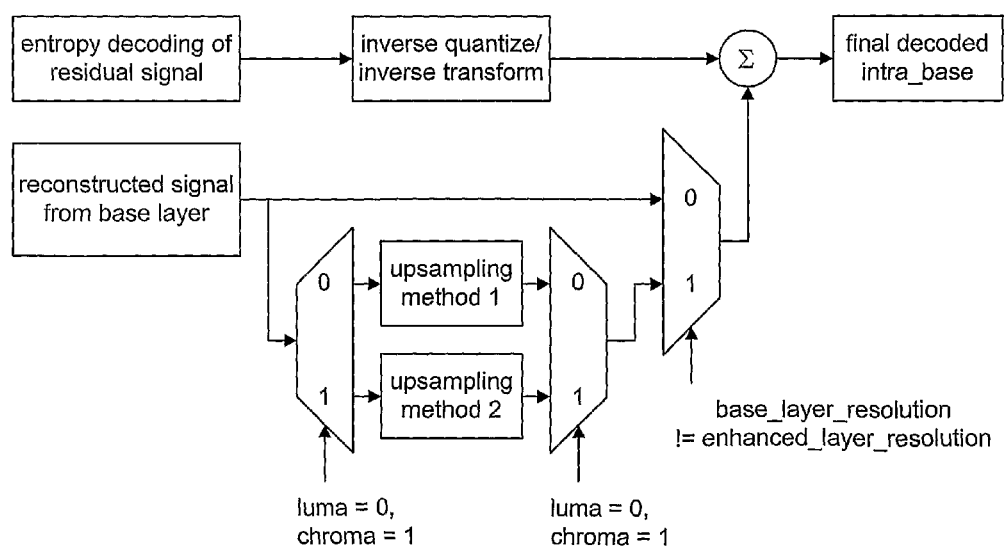
Figure 7:
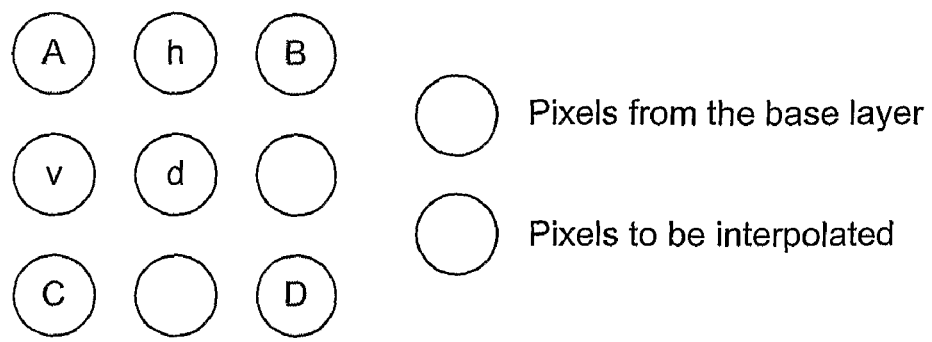

FIG. 6 is a diagram illustrating a process of up-sampling the luminance and chrominance signals of a base layer, which have decoded image data, using different methods and decoding an enhanced layer, which has been encoded in an intra base mode, using the results of up-sampling, according to the second embodiment of the present invention; and FIG. 7 is a diagram illustrating the relative locations of respective pixels in the second embodiment of the present invention, in which chrominance signals having residual data are up-sampled by two.

5. MODES FOR CARRYING OUT THE INVENTION

Reference now should be made to the drawings, in which the same reference numerals are used throughout the different drawings to designate the same or similar components.

Figure 4:
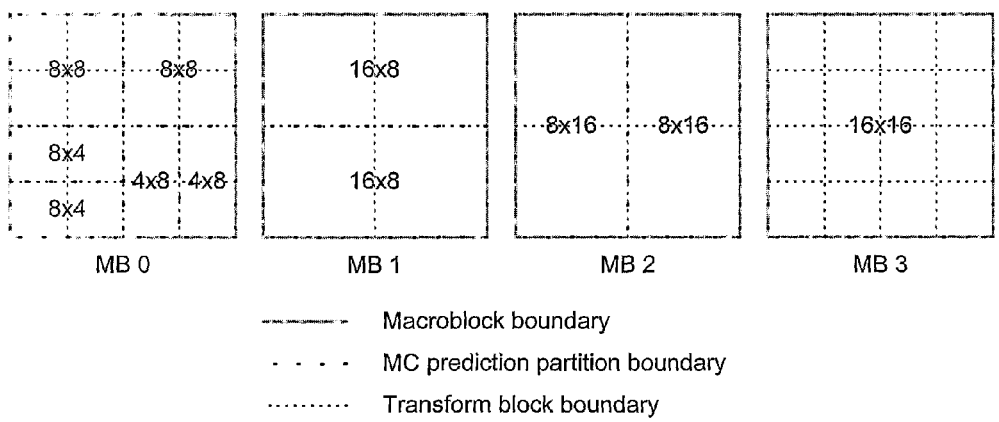
FIG. 4 is a diagram illustrating various examples of a macro block, a transform block, and partitioning.

FIG. 4 illustrates various examples of a macro block, a transform block, and partitioning.

A macro block generally has a 16×16 pixel size. A transform, such as DCT, is performed on 4×4 blocks or 8×8 blocks, and one having high coding efficiency is selected. In this case, the term partitioning, a macro block type, or a mode refers to a block having one of various shapes to which sub-blocks, of which reference frames (reference indices) including reference blocks and/or motion vectors indicating displacements to the reference blocks (reference index and motion vector are referred to as motion information) coincide with each other, are merged, or the partitioning of a macro block into which blocks, in which pieces of motion information coincide with each other, are combined, when the macro block is encoded using a motion compensated prediction method.

For example, in the AVC standard, a minimum unit for which motion information, such as mode or partitioning, a reference index and a motion vector, is defined has been determined. A motion vector is defined on the basis of a sub-block having a minimum of a 4×4 size, and a reference index is defined on the basis of a sub-macro block having a minimum of an 8×8 size. Furthermore, a motion vector and a reference index can each be defined on the basis of a macro block having a maximum of a 16×16 size. When 4×4 sub-blocks having the same motion vector are merged with each other, a motion vector may be defined for a 4×8, 8×4, 8×8, 8×16, 16×8 or 16×16 unit. In the same way, when 8×8 sub-macro blocks having the same reference index are merged with each other, a reference index may be defined for an 8×16, 16×8 or 16×16 unit.

In MB0, the size of a transform block is 4×4, and partitioning is composed of an 8×8 block, an 8×8 block, two 8×4 blocks and two 4×8 blocks. In MB1, the size of a transform block is 8×8, and partitioning is composed of a 16×8 mode, that is, two 16×8 blocks. In MB2, the size of a transform block is 8×8, and partitioning is composed of 8×16 mode, that is, two 8×16 blocks. In MB3, the size of a transform block is 4×4, and partitioning is composed of a 16×16 mode, that is, one 16×16 block.

Figure 1:
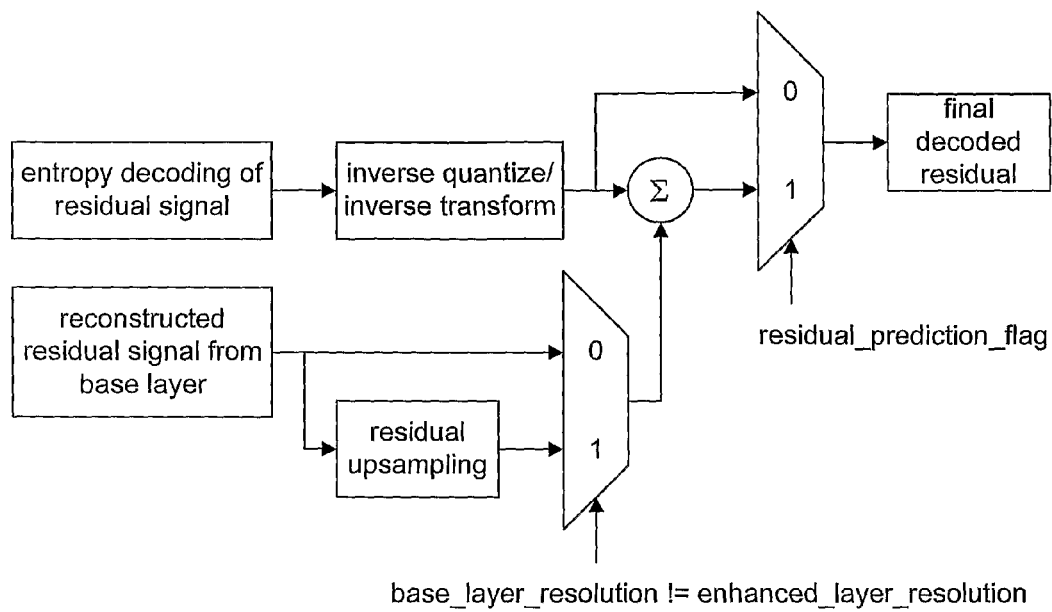
FIG. 1 is a diagram illustrating an embodiment in which an enhanced layer, which has been encoded in an inter mode and has residual data, is decoded using the residual data of a base layer.
Figure 2:
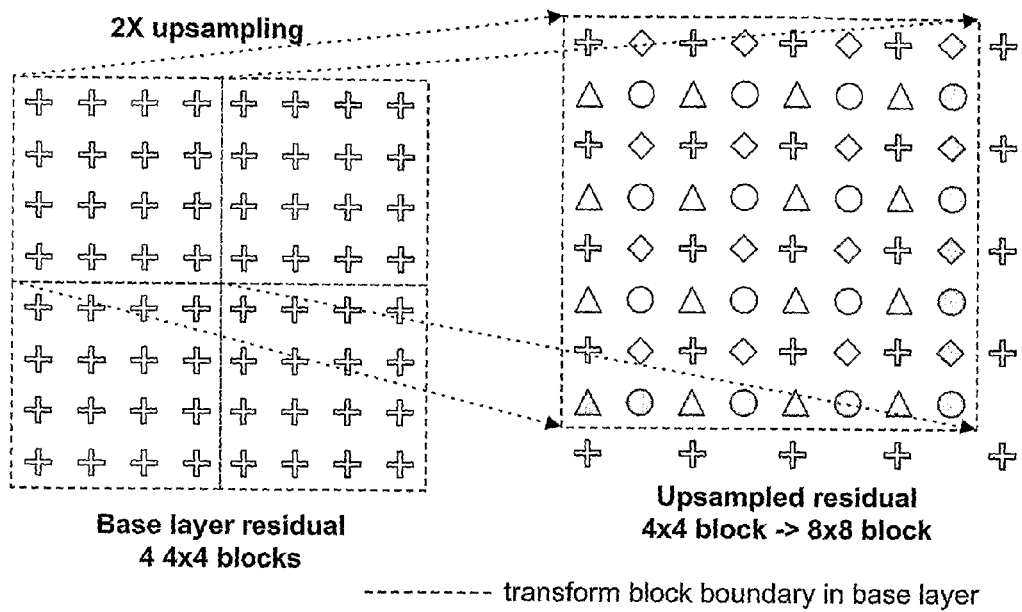
FIG. 2 is a diagram illustrating an example of the up-sampling of a 4×4 residual block in a dyadic case.
Figure 3:
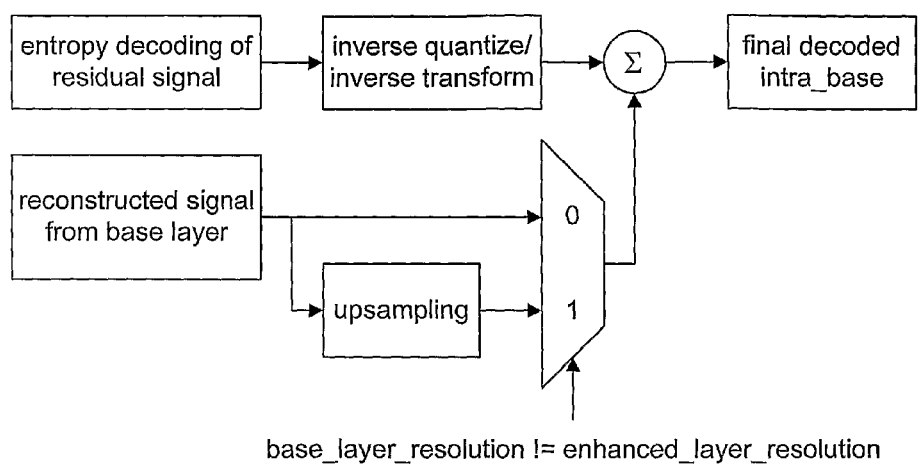
FIG. 3 is a diagram illustrating an embodiment in which an enhanced layer, which has been encoded in an intra base mode, is decoded using the decoded image data of a base layer.

In residual up-sampling, pixels existing at the boundary of a block to be considered and pixels existing inside a block, as illustrated in FIG. 2, give rise to new pixels through different operations.

For pixels not existing at the boundary of a block to be considered, a bi-linear interpolation filter or a 6 tap interpolation filter is uniformly used. Different operations are performed on pixels existing at the boundary of a block depending on the locations of the pixels relative to the boundary. That is, by reducing the number of pixels on which separate operations are performed, that is, the number of pixels existing at the boundary, and increasing the number of pixels which can be uniformly processed, residual up-sampling can be simplified.

Accordingly, in a first embodiment of the present invention, when residual up-sampling is performed, only the boundary for motion compensated prediction partitioning is taken into consideration, instead of the boundary of a transform block.

That is, as long as the boundary of a transform block is not the boundary for motion compensated prediction partitioning, filtering for up-sampling is applied beyond the boundary of the transform block. In this case, the boundary of a base layer, not that of an enhanced layer, is used as the boundary of the transform block and the boundary for the motion compensated prediction partitioning.

In MB0, with the boundaries of two upper 8×8 prediction blocks, the boundaries of two lower left 8×4 prediction blocks and the boundaries of two lower right 4×8 prediction blocks, instead of the boundary of a 4×4 transform block, being considered as the boundary of a block, different operations are applied to pixels existing at the boundary to perform residual up-sampling.

In MB1, the boundaries of two 16×8 prediction blocks, instead of the boundary of an 8×8 transform block, are the boundary of a block that determines whether to apply an up-sampling filter. In the same way, in MB2, the boundaries of two 8×16 prediction blocks, instead of the boundary of an 8×8 transform block, are considered the boundary of a block. Furthermore, in MB3, the boundary of a 16×16 macro block, instead of the boundary of a 4×4 transform block, is considered the boundary of a block.

In general, video signals are managed with components associated with chrominance information Cb and Cr and components associated with luminance information Y being separated from each other. The sampling rate of luminance signals to chrominance signals is generally 4:2:0. The samples of chrominance signals are located between the samples of luminance signals. That is, for video signals, the number of samples of chrominance signals is smaller than that of luminance signals. The reason for this is that humans' optic nerves are more sensitive to luminance signals than to chrominance signals.

Accordingly, in a second embodiment of the present invention, different up-sampling filters are applied to luminance signals and chrominance signals. An up-sampling filter simpler than that for luminance signals is applied to chrominance signals.

Figure 5:
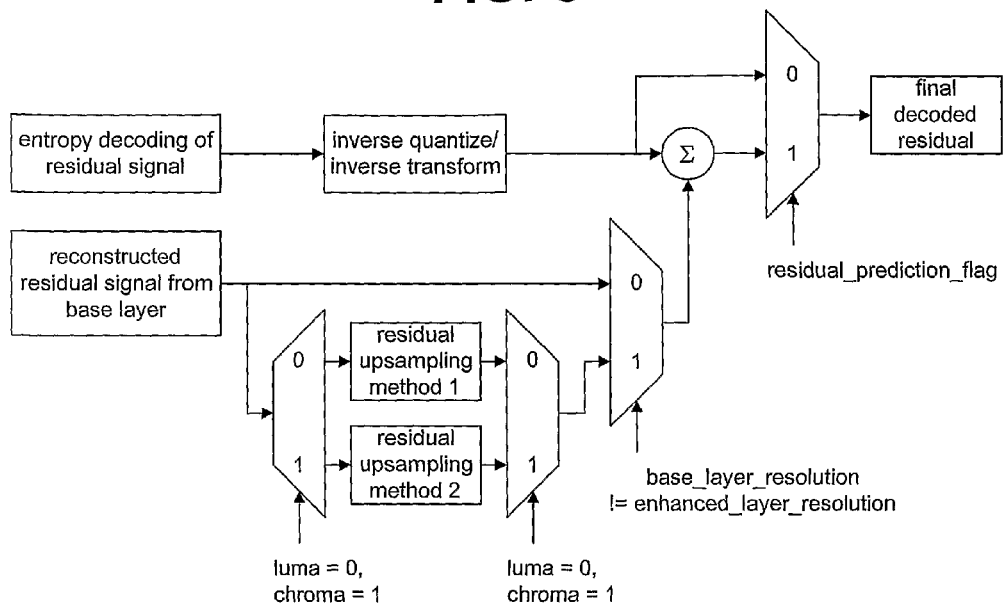
FIG. 5 is a diagram illustrating a process of up-sampling the luminance and chrominance signals of a base layer, which has residual data, using different methods, and decoding an enhanced layer, which has been encoded in an inter mode and has residual data, using the results of up-sampling, according to a second embodiment of the present invention.

FIG. 5 illustrates a process of up-sampling the luminance and chrominance signals of a base layer, which has residual data, using different methods and decoding an enhanced layer, which has been encoded in an inter mode and has residual data, using up-sampling results, according to the second embodiment of the present invention.

FIG. 6 illustrates a process of up-sampling the luminance and chrominance signals of a base layer, which have decoded image data, using different methods and decoding an enhanced layer, which has been encoded in an intra base mode, using up-sampling results, according to the second embodiment of the present invention.

As illustrated in FIGS. 5 and 6, different filtering methods are applied to luminance and chrominance signals. The up-sampling method 1 of FIGS. 5 and 6 is a filtering method of up-sampling luminance signals, while the up-sampling method 2 of FIGS. 5 and 6 is a filtering method of up-sampling chrominance signals.

In the second embodiment of the present invention, for example, a 6 tap interpolation filter may be used as a filter for up-sampling luminance signals, and, for example, a bi-linear interpolation filter may be used as a filter for up-sampling chrominance signals.

Meanwhile, the residual data is composed of different values between an image block desired to be encoded and a reference block having image data similar to the image block, so that the absolute value of data is small and the variation in value between adjacent pixels is low. Furthermore, as described above, chrominance signals stimulate humans' optic nerves less than do luminance signals.

This means that a simpler method can be applied to the up-sampling of chrominance signals having residual data than to the up-sampling of luminance signals having residual data. Furthermore, it also means that a simpler method can be applied to the up-sampling (residual prediction mode) of chrominance signals having residual data than to the up-sampling (intra base mode) of chrominance signals having decoded image data.

Accordingly, for example, in the case where the ratio of the resolutions of a base layer and an enhanced layer is dyadic, the residual up-sampling (the residual up-sampling method 2 of FIG. 5) of chrominance signals within a boundary (the boundary of a transform block or the boundary of motion compensated prediction partitioning) is defined as $h=v=d=A+D+1>>1$ or $h=v=d=B+C+1>>1$, the computational load necessary for up-sampling can be reduced.

In that case, the relative locations of A, B, C, D, h, v and d are illustrated in FIG. 7. Pixels to be inserted between the pixels (samples) of A, B, C and D chrominance signals are not calculated using different equations, and each of the pixels is simply calculated as the average value of two corresponding pixels, which are located in a diagonal direction, using the same equation.

In contrast, in the case where the ratio of the resolutions of a base layer and an enhanced layer is not dyadic, the residual up-sampling of chrominance signals within the boundary of a transform block or the boundary of motion compensated prediction partitioning may be performed using a bi-linear interpolation filter, in which case weights are determined in consideration of the relative locations and/or phase shifts between the chrominance samples (pixels) of the base and enhanced layers.

Furthermore, in the up-sampling of the chrominance signals of an intra base mode (the up-sampling method 2 of FIG. 6), the pixels of the chrominance signals of a base layer are up-sampled using a bi-linear interpolation filter which is simpler than the 6 tap interpolation filter used for luminance signals. In this case, weights may also be determined in consideration of the relative locations and/or phase shifts between the chrominance samples of the base and enhanced layers.

Meanwhile, the up-sampling of a base layer is performed in the case of encoding an enhanced layer in a residual prediction mode or an intra base mode, and in the case of decoding an enhanced layer encoded in a residual prediction mode or an intra base mode.

Accordingly, the up-sampling methods according to the present invention may be applied to both encoding and decoding devices for encoding and decoding video signals using an interlayer prediction method.

Furthermore, the decoding devices to which the up-sampling methods according to the present invention are applied may be mounted in mobile communication terminals or recording media playing devices.

Accordingly, when a base layer is up-sampled in the interlayer prediction, the number of pixels to be specially processed is reduced, therefore the efficiency of up-sampling is improved and computational load can be reduced through the application of a more simplified operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for decoding a video signal, comprising:
   obtaining a reference block of a current block in a first layer;
   generating a reference luminance data based on a tap filter and luminance data of the reference block;
   generating a reference chrominance data based on a bi-linear interpolation filter; and
   decoding the current block in a second layer based on the reference luminance data and the reference chrominance data.

2. The method of claim 1, wherein when generating the reference chrominance data, weights are determined based on relative locations or phase shifts between chrominance data samples of the first and second layers.

3. The method of claim 1, wherein the bi-linear interpolation filter is performed in consideration of the relative locations between samples.

4. The method of claim 3, wherein the relative locations are relative locations between samples of the first layer and samples of the second layer.

* * * * *